United States Patent Office 2,872,452
Patented Feb. 3, 1959

2,872,452

N-CARBOCYCLOHEXOXY- AND CERTAIN N-CAR-BOALKOXY-METHYL DERIVATIVES IN QUATERNARY TROPEINES

Karl Zeile, Franz Adickes, and Helmut Wick, Ingelheim (Rhine), Germany, assignors to C. H. Boehringer Sohn, Ingelheim (Rhine), Germany, a partnership of Germany No Drawing. Application December 14, 1956
Serial No. 628,233

5 Claims. (Cl. 260—292)

This invention relates to quaternized tropine, atropine and scopolamine compounds and a method of producing the same by quaternizing tropine, atropine or scopolamine with esters formed from halogen-acetic acids and aliphatic or cycloaliphatic alcohols with 6 to 11 carbon atoms in the molecule.

Processes for the production of tropeines quaternized with low-molecular-weight alkyl halides (alkyl 1–5 carbon atoms) and halogen-acetic acid alkyl esters (alkyl 1–4 carbon atoms) are known. These compounds either exhibit a substantially lesser spasmolytic effect than atropine, or if they do exhibit satisfactory spasmolytic effects they produce undesirable side effects which make their therapeutic use not advisable.

It has now been found that compounds having the general structural formulas

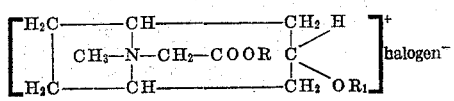

and

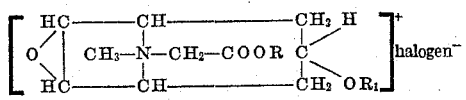

are highly effective spasmolytic agents which produce side effects such as dilation of the pupils, acceleration of the pulse rate, reduction in the secretion of saliva and so forth only to a negligible extent. In the above formula R represents a straight-chain or branched-chain alkyl radical or a cycloaliphatic radical with 6–11 carbon atoms, and $R_1$ is the radical of an acid which comprises an aromatic ring.

The present invention also relates to a process for the production of compounds having the above-indicated general formula, which comprises quaternizing tertiary tropeines with esters formed from halogen-acetic acids and aliphatic or cycloaliphatic alcohols with 6–11 carbon atoms.

The starting material may be any desired ester formed from tropine or an alcohol related to tropine, such as scopine, with an acid having an aromatic ring system in the molecule. Especially suitable are atropine, homatropine, tropine-benzilic acid ester and scopolamine.

The quaternization of a tropeine compound with halogen-acetic acid alkyl esters or cycloalkyl esters, which proceeds more rapidly and with better yields than the quaternization with alkyl halides, may be carried out in the presence or absence of inert solvents at room temperature. Examples of solvents which may be used are acetonitrile, chloroform, acetone, or methanol. In some cases it is advantageous to heat the reaction mixture to about 60° C. To bring about the quaternization, the reactants are reacted with each other for periods ranging from several hours to several months depending upon their reactivity and the effect of the solvent used. The reactants may be admixed with each other directly or in the form of solutions. The most advantageous reaction temperature may be determined by a simple preliminary experiment and may range from room temperature to about 60° C.

The following examples will further illustrate the present invention and enable others skilled in the art to understand it more completely. It is not intended, however, to limit the invention to these particular examples.

EXAMPLE I

*Production of diphenyl-hydroxyacetyl-N-carboheptoxymethyltropinium bromide*

20 gm. diphenyl-hydroxyacetyl-tropine (tropine-benzilic acid ester) were dissolved in 75 cc. chloroform and the solution was admixed with 27 gm. bromoacetic acid heptyl ester (molar ratio 1:2). The resulting reaction mixture was allowed to stand at about 20° C. for four weeks. The crystals precipitated thereby (8.2 gm.) were filtered off, and the solvent and excess ester were distilled out of the filtrate, toward the end in a vacuum of 3 mm. mercury. The crystals and the distillation residue were combined and recrystallized from ethanol, yielding 24.3 gm. diphenyl-hydroxyacetyl-N-carboheptoxymethyl-tropinium bromide, which corresponds to 75% of the theoretical yield. The melting point of the product was 193° C.

EXAMPLE II

*Production of diphenyl-hydroxyacetyl-N-carboheptoxymethyl-tropininum chloride*

35.1 gm. (1/10 mol) benzilic acid tropine ester were dissolved in 100 cc. chloroform and 100 cc. acetonitrile and the solution was admixed with 38.5 gm. (2/10 mol) chloroacetic acid heptyl ester. The resulting mixture was allowed to stand for six days at about 60° C. After cooling and permitting the crystallization to go to completion, the crystalline precipitate was filtered off by vacuum filtration. Recrystallization of the filter cake from isopropanol yielded 44.4 gm. diphenyl-hydroxyacetyl-N-carboheptoxymethyl-tropinium chloride, corresponding to 81% of the theoretical yield. The melting point of the product was 190° C.

EXAMPLE III

*Production of N-carbohexoxymethyl-scopolammonium bromide*

30.3 gm. (0.1 mol) scopolamine were admixed with 90 gm. (about 0.4 mol) bromoacetic acid hexyl ester, and the resulting mixture was allowed to stand for 48 hours at room temperature. At the end of that time the major portion of the quaternary reaction product had crystallized out of the reaction mixture. The crystalline precipitate was filtered off and recrystalized from acetone, yielding 50.8 gm. N-carbohexoxymethyl-scopolammonium bromide, which corresponds to 96.3% of the theoretical yield. The product had a melting point of 118°–120° C. and a refractive index $[\alpha]_D^{20} = -10.0°$ in ethanol.

EXAMPLE IV

*Production of N-carboctoxymethyl-tropinium bromide-benzilic acid ester*

10 gm. (1/35 mol) tropine-benzilic acid ester were dissolved in 35 cc. chloroform and 200 cc. acetonitrile, and the resulting solution was admixed with 15 gm. (about 2/35 mol) bromoacetic acid-octyl ester. The mixture was allowed to stand at room temperature. The excess ester and the solvent were distilled off, toward the end in a vacuum of about 3 mm. mercury, whereupon the distillation residue crystallized after a short period of time. The crystalline product was washed with acetone and recrystallized from ethanol, yielding 13 gm. N-carboctoxymethyl-tropinium bromide-benzilic acid ester, which corresponds to 75% of the theoretical yield. The product had a melting point of 184° C. Additional reaction product was obtained by working up the mother liquors.

EXAMPLE V

*Production of diphenyl-hydroxyacetyl-N-carboctoxymethyltropinium chloride*

35.1 gm. (1/10 mol) benzilic acid-tropine ester were dissolved in 100 cc. chloroform and 100 cc. acetonitrile, and the resulting solution was admixed with 41.3 gm. (about 2/10 mol) chloroacetic acid octyl ester and allowed to stand, as described in Example II. The crystalline reaction product was recrystallized from isopropanol, yielding 46.5 gm. diphenyl-hydroxyacetyl-N-carboctoxymethyl-tropinium chloride, which corresponds to 83% of the theoretical yield. The recrystallized product had a melting point of 183° C.

EXAMPLE VI

*Production of N-carbocyclohexoxymethyl-atropinium bromide*

50 gm. atropine were dissolved in 20 cc. chloroform and 100 cc. acetonitrile, and to this solution 80 gm. bromoacetic acid cyclohexyl ester were added. After about half an hour the reaction mixture developed some heat, and in the course of the following day a crystalline mass formed which was filtered off by vacuum filtration and recrystallized from acetonitrile. 60 gm. of N-carbocyclohexoxymethyl-atropinium bromide were obtained, which corresponds to 72% of the theoretical yield. The recrystallized product had a melting point of 170–172° C.

EXAMPLE VII

*Production of N-carbononoxymethyl-atropinium bromide*

50 gm. (0.17 mol) atropine were dissolved in 20 cc. chloroform and 100 cc. acetonitrile and 88 gm. (0.33 mol) bromoacetic acid nonyl ester were added to this solution. After about half an hour the reaction mixture warmed up and in the course of the next day a crystalline mass was formed, which was filtered off by vacuum filtration and recrystallized from acetonitrile. The yield was 88.4 gm. of N-carbononoxymethyl-atropinium bromide, which corresponds to 92% of the theoretical yield. The recrystallized product had a melting point of 140–143° C.

EXAMPLE VIII

*Production of N-carboheptoxymethyl-scopolammonium bromide*

30.3 gm. (0.1 mol) scopolamine were admixed with 90 gm. (about 0.4 mol) bromoacetic acid heptyl ester and the mixture was allowed to stand for 48 hours at room temperature. At the end of this period the quaternizing reaction had gone to substantial completion and the major portion of the reaction product had crystallized out. The crystalline product was filtered off and recrystallized from isopropanol, yielding 52 gm. N-carboheptoxymethyl-scopolammonium bromide, which corresponds to 96% of the theoretical yield. The recrystallized product had a melting point of 130° C. and a refractive index $[\alpha]_D^{20} = -9.7°$ in ethanol.

The following table shows the results of tests which were made to determine the spasmolytic effect and the pupil-dilating side effect of various quaternary tropine compounds produced in accordance with the present invention, assuming the corresponding values of atropine to be equal to 1.

TABLE I

| Compound | Melting Point | Spasmolysis | Dilation of Pupils |
|---|---|---|---|
| N-carboheptoxymethyl-atropinium bromide. | Recrystallized from ethanol: 160–164° C. | 1 | 1/10 |
| N-carbononoxymethyl-atropinium bromide. | Recrystallized from acetonitrile: 140–143° C. | 1/5 | 1/1000 |
| N-carbodecoxymethyl-atropinium bromide. | Recrystallized from acetonitrile: 127–130° C. | 1/50 | 1/1000 |
| N-carbocyclohexoxymethyl-atropinium bromide. | Recrystallized from acetonitrile: 170–172° C. | 1 | 1/10 |
| N-carbohexoxymethyl-scopolammonium bromide. | Recrystallized from acetone: 118–120° C. | 1/2 | 1/50 |
| N-carboheptoxymethyl-scopolammonium bromide. | Recrystallized from isopropanol: 130° C. $[\alpha]_D^{20} = -9.7$ in ethanol. | 1 | 1/10 |
| Diphenyl-hydroxyacetyl-N-carbohexoxymethyl-tropinium bromide. | Recrystallized from ethanol: 199° C. | 1/2 | 1/100 |
| Diphenyl-hydroxyacetyl-N-carboheptoxymethyl-tropinium bromide. | Recrystallized from ethanol: 193° C. | 1 | 1/1000 |
| Diphenyl-hydroxyacetyl-N-carboctoxymethyl-tropinium bromide. | Recrystallized from ethanol: 184° C. | 1½ | 1/1000 |
| Diphenyl-hydroxyacetyl-N-carbononoxymethyl-tropinium bromide. | Recrystallized from ethanol: 180° C. | 1/2 | 1/400 |
| Diphenyl-hydroxyacetyl-N-carbodecoxymethyl-tropinium bromide. | Recrystallized from ethanol: 190° C. | 1/2 | <1/500 |

The above table clearly shows that the particular quaternary compounds produced in accordance with the present invention not only exhibit good spasmolytic properties but also a much reduced pupil-dilating side effect, as compared to atropine.

The following table shows the spasmolytic and pupil-dilating values of heretofore known tropine compounds determined under identical conditions, and assuming the corresponding values of atropine to be equal to 1.

TABLE II

| Compound | Spasmolysis | Dilation of Pupils |
|---|---|---|
| N-carbethoxymethylatropinium bromide | 1/50–1/100 | 1/50–1/100 |
| N-n-butyl-atropinium bromide | 1/5 | 1/5 |
| Diphenyl-acetyl-N-carbopropoxymethyl-tropinium bromide | 1/100 | |
| Diphenyl-hydroxyacetyl-N-carbopropoxymethyl-tropinium bromide | 1/1000 | |
| Diphenyl-hydroxyacetyl-N-carbobutoxymethyl-tropinium bromide | 1/10 | 1/5 |

Table II clearly shows that the enumerated known compounds either exhibit lesser spasmolytic characteristics than atropine or, if their spasmolytic characteristics are good, their therapeutic use is seriously restricted because of the intensity of the undesirable side effects which they produce.

While we have illustrated our invention with the aid of certain specific embodiments thereof, it will be apparent to those skilled in the art that the invention is not limited to those embodiments, and that various changes and modifications may be made without departing from the spirit of the invention or the scope of the appended claims.

We claim:

1. Quaternary tropeine compounds having a structural formula selected from the group consisting of

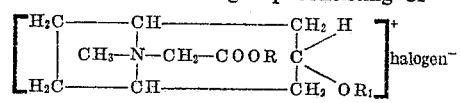

and

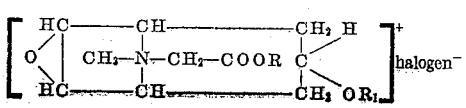

wherein R is selected from the group consisting of straight-chain and branched-chain alkyl radicals with 6 to 11 carbon atoms and cyclohexyl, and $R_1$ is selected from the group consisting of diphenyl-hydroxyacetyl and phenyl-methylhydroxy-acetyl.

2. Diphenyl - hydroxyacetyl - N - carboheptoxymethyl-tropinium chloride.

3. Diphenyl - hydroxyacetyl - N - carboctoxymethyl-tropinium chloride.

4. N-carbononoxymethyl-atropinium bromide.

5. N-carboheptoxymethyl-scopolammonium bromide.

References Cited in the file of this patent

Fodor et al.: Chem. Abstracts, vol. 48, columns 10029–30 (1954).